United States Patent
Hart et al.

(10) Patent No.: US 9,147,399 B1
(45) Date of Patent: Sep. 29, 2015

(54) IDENTIFICATION USING AUDIO SIGNATURES AND ADDITIONAL CHARACTERISTICS

(75) Inventors: Gregory M. Hart, Mercer Island, WA (US); Allan Timothy Lindsay, Seattle, WA (US); William F. Barton, Harvard, MA (US); John Daniel Thimsen, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 442 days.

(21) Appl. No.: 13/601,551

(22) Filed: Aug. 31, 2012

(51) Int. Cl.
*G10L 17/00* (2013.01)

(52) U.S. Cl.
CPC .................... *G10L 17/005* (2013.01)

(58) Field of Classification Search
CPC ................ G10L 17/00; G10L 15/02
USPC ........................ 704/246, 239, 275
See application file for complete search history.

(56) References Cited

U.S. PATENT DOCUMENTS

| | | | |
|---|---|---|---|
| 6,735,695 B1* | 5/2004 | Gopalakrishnan et al. | ... 713/186 |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 8,306,514 B1* | 11/2012 | Nunally | ..... 455/414.2 |
| 2003/0171930 A1* | 9/2003 | Junqua | ........... 704/275 |
| 2007/0047719 A1* | 3/2007 | Dhawan et al. | ............... 379/235 |
| 2011/0288866 A1* | 11/2011 | Rasmussen | .......... 704/246 |
| 2012/0223885 A1 | 9/2012 | Perez | |
| 2012/0264446 A1* | 10/2012 | Xie et al. | ........... 455/456.1 |

FOREIGN PATENT DOCUMENTS

WO WO2011088053 7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

Primary Examiner — Jakieda Jackson
(74) Attorney, Agent, or Firm — Lee & Hayes, PLLC (57) ABSTRACT

Techniques for identifying users that issue audio commands based on signatures associated with the commands and additional characteristics associated with the commands. For instance, a device that includes a microphone may capture audio uttered by a user. The device, or another device, may then compare a signature associated with a generated audio signal to audio signatures associated with known users. For instance, the device may have access to multiple audio signatures, each of which is unique to a respective user that has previously interacted with the device or with another device. The device may then use this comparison to help identify the user that uttered the audio. In addition, however, the device may utilize a characteristic other than the audio signature. Using both the comparison of the audio signature to the previously received signatures along with the additional characteristic(s), the device may make a presumed identification of the user.

28 Claims, 6 Drawing Sheets

IDENTIFICATION USING AUDIO SIGNATURES AND ADDITIONAL CHARACTERISTICS

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes, in part, techniques for identifying users that issue audio commands based on signatures associated with the audio commands and on at least one additional characteristic associated with the commands. For instance, a device that includes a microphone may capture audio uttered by a user. That device, or another device, may then compare a signature associated with an audio signal generated from received audio to audio signatures associated with known users. For instance, the device may have access to multiple audio signatures, each of which may be unique to a respective user that has previously interacted with the device or with another device. The device may then use this comparison to help identify the user that uttered the audio. In addition, however, the device may utilize a characteristic other than the audio signature. Using both the comparison of the audio signature to the previously received signatures along with the additional characteristic(s), the device may identify the user that uttered the audio. Furthermore, in some instances identification of the user may in turn be used to help identify the command uttered by the user (e.g., due to a usage pattern or prior commands issued by the identified user).

The device may utilize an array of different characteristics associated with the audio in order to identify the user. For instance, the device may determine a command associated with the audio (e.g., "Play the Beatles", "Remind me to pick up Grace from School", etc.) to help identify the user. In one example, the device may compare the command to previously received commands or interactions from different user(s) to aid in the identification. For instance, if a user has previously requested to play a particular song many times, then the device may use this to help determine that the user uttering the audio is that particular user. Or, if the command is a request to remind the user to pick up her daughter from school, then the device may deduce that the user is a parent or guardian of the daughter.

Additionally or alternatively, the device may determine a sequence of words, grammar, or vocabulary of the command to identify the user. For instance, certain users may choose certain words or use certain grammar, which may aid in identifying the user that uttered the audio.

In another example, the device may identify content associated with the command and utilize this content to aid in identifying the user. For instance, if the command requests to play a certain piece of content (e.g., an audio file), the device may determine which user(s) have access to that content and/or which do not. In one example, if a user requests to play a song by the Beatles, the device may determine which user(s) have access rights to Beatles' songs and/or albums in determining the identity of the user that is uttering the command. Similarly, the device may identify a third-party service associated with the command and may utilize this information to aid in identifying the user. For instance, if the command requests that the device launch a particular music service, the device may identify which users have access to that service and which do not.

In yet another example, the device may reference schedules associated with different users. For instance, if a schedule of a particular user shows that the user is scheduled to be a location other than where the device resides, then the device may use this information in deducing that this particular user is likely not the user issuing the command. Or, the device may positively correlate a command with a user's schedule. For instance, if the command requests directions to a particular location, and the device has determined that the particular user has an appointment at that location, the device may use this information to deduce that the particular user uttered the command.

Similarly, the device may determine geographical locations associated with respective users to aid in the identification process. For instance, the device may receive a GPS location from a client device (e.g., a mobile device) associated with a user to help determine whether that particular user uttered the audio. If the GPS location indicates that the mobile device of the user is proximate to the device, then the device may deduce that the user may have issued the command. If the GPS location indicates that the mobile device of the user is remote from the device, then the device may deduce that the user likely did not issue the command.

In another example, the device may reference a day (e.g., Friday, Saturday, etc.), season (e.g., fall, winter, etc.), time of day, or the like when attempting to identify the user. For instance, the device may have previously determined that certain users often issue commands on certain days, during certain seasons, at certain times or the like, while other users often issue commands on different days, seasons, and/or times.

In still another example, the device may reference a location of the device itself in the identification process. For instance, if a home includes multiple devices, each in a respective room, each device may utilize its known location for identifying the user. For example, a device residing in a mother's home office may more greatly weight the possibility that the mother issued a command received by that device. Conversely, if the device is resident in a child's room, that device may use this information to more greatly weight the possibility that the child issued the command. Similarly, each device may analyze the commands it has received over time for use in identifying which user is currently issuing a command. For instance, if a device has received 90% of its commands from the mother of a family, in response to receiving a subsequent command the device may weight the possibility that the mother is issuing the command more greatly.

In addition, the device may utilize a location in a particular room from which a command emanates to determine an identity of a user that issues the command. For instance, the device may utilize beamforming techniques, time-of-flight techniques, or other techniques to pinpoint a location in a room from which the user uttered the audio. The device may then use this location to aid in the identification. For instance, if the device comes from a location from which a father of a family often issues commands (e.g., a particular chair in which the father often sits), then the device may more greatly weight the possibility that the father is the source of the audio.

In still other instances, the device may capture audio in addition to the user's audio to aid in the identification process. For instance, the device may capture background noise, such as a song playing on another device, a television show playing in the background, whether there are cooking noises in the background, or the like. The device may then use this information to deduce the identity of the user. For example, the device may identify a particular song playing in the background and may have previously learned that a particular user often listens to that song or that artist and, hence, may weight more greatly the probability that the particular user issued the command.

While a few non-limiting example characteristics are described above and below, the devices and techniques described herein may utilize any other characteristic in addition to an audio signature to identify a user issuing a command. Furthermore, the devices and techniques described above may be implemented in a variety of different architectures and contexts. One non-limiting and illustrative implementation is described below.

Illustrative Environment

Figure 1:
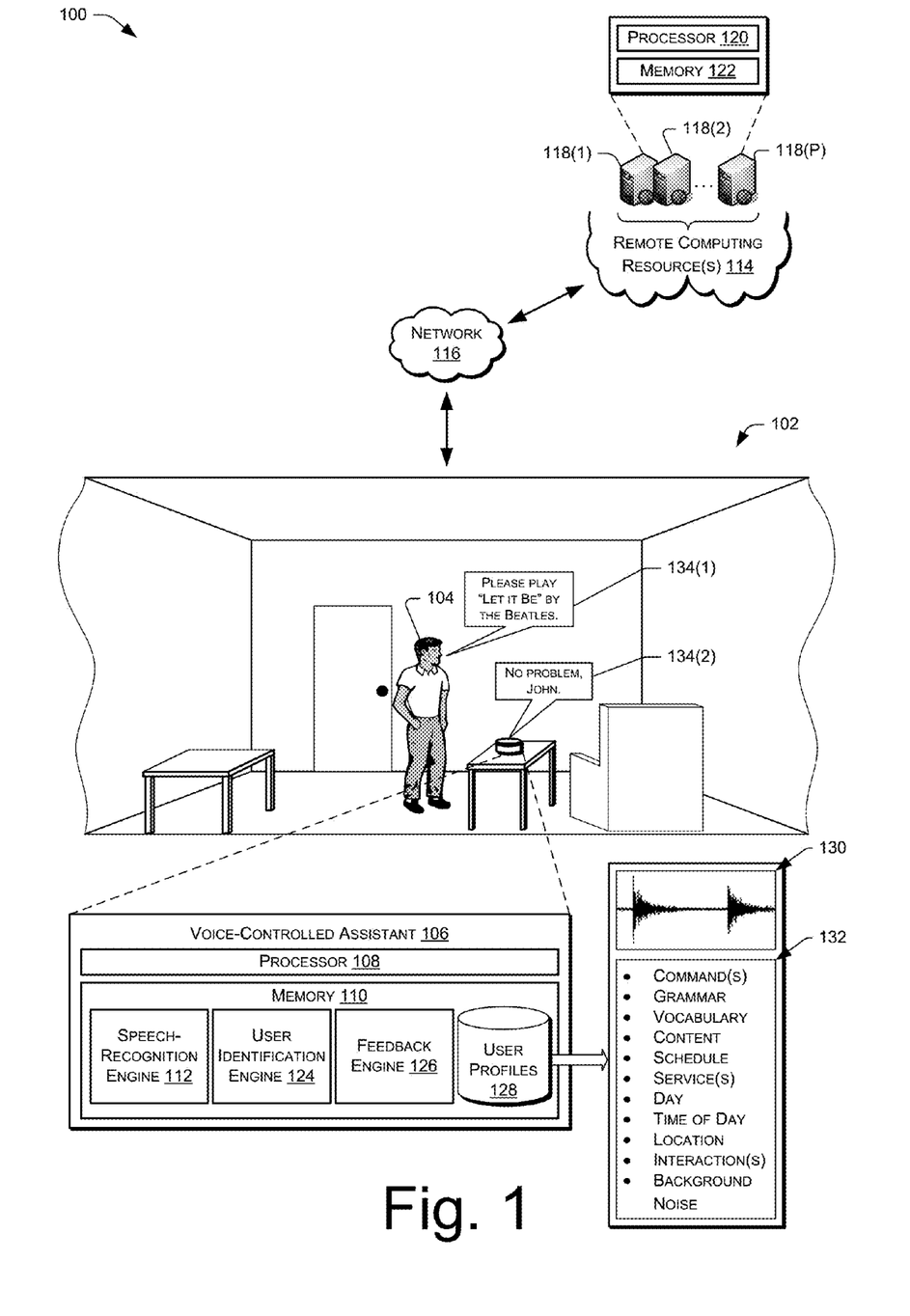
FIG. 1 shows an illustrative voice interaction computing architecture set in a home environment. The architecture includes a voice-controlled assistant physically situated in the home, along with a user who is uttering a command to the voice-controlled assistant. The voice-controlled assistant, or another device, captures audio that includes the command and attempts to identify the user issuing the command based on an audio signature associated with a generated audio signal and at least one other factor.

FIG. 1 shows an illustrative voice interaction computing architecture 100 set in a home environment 102 that includes a user 104. The architecture 100 also includes an electronic voice-controlled assistant 106 with which the user 104 may interact. In the illustrated implementation, the voice-controlled assistant 106 is positioned on a table within a room of the home environment 102. In other implementations, it may be placed in any number of locations (e.g., ceiling, wall, in a lamp, beneath a table, under a chair, etc.). Further, more than one assistant 106 may be positioned in a single room, or one assistant may be used to accommodate user interactions from more than one room.

Generally, the voice-controlled assistant 106 has at least one microphone and at least one speaker to facilitate audio interactions with the user 104 and/or other users. In some instances, the voice-controlled assistant 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic assistant 106 may be through voice input and audible output. One example implementation of the voice-controlled assistant 106 is provided below in more detail with reference to FIG. 2.

The microphone of the voice-controlled assistant 106 detects audio from the environment 102, such as sounds uttered from the user 104. As illustrated, the voice-controlled assistant 106 includes a processor 108 and memory 110, which stores or otherwise has access to a speech-recognition engine 112. As used herein, a processor may include multiple processors and/or a processor having multiple cores. The speech-recognition engine 112 performs speech recognition on audio captured by the microphone, such as utterances spoken by the user 104. The voice-controlled assistant 106 may perform certain actions in response to recognizing different speech from the user 104. The user may speak predefined commands (e.g., "Awake"; "Sleep"), or may use a more casual conversation style when interacting with the assistant 106 (e.g., "I'd like to go to a movie. Please tell me what's playing at the local cinema.").

In some instances, the voice-controlled assistant 106 may operate in conjunction with or may otherwise utilize computing resources 114 that are remote from the environment 102. For instance, the voice-controlled assistant 106 may couple to the remote computing resources 114 over a network 116. As illustrated, the remote computing resources 114 may be implemented as one or more servers 118(1), 118(2), . . . , 118(P) and may, in some instances form a portion of a network-accessible computing platform implemented as a computing infrastructure of processors, storage, software, data access, and so forth that is maintained and accessible via a network such as the Internet. The remote computing resources 114 do not require end-user knowledge of the physical location and configuration of the system that delivers the services. Common expressions associated for these remote computing devices 114 include "on-demand computing", "software as a service (SaaS)", "platform computing", "network-accessible platform", "cloud services", "data centers", and so forth.

The servers 118(1)-(P) include a processor 120 and memory 122, which may store or otherwise have access to some or all of the components described with reference to the memory 110 of the voice-controlled assistant 106. For instance, the memory 122 may have access to and utilize the speech-recognition engine 112 for receiving audio signals from the assistant 106, recognizing speech and, potentially, causing performance of an action in response. In some examples, the voice-controlled assistant 106 may upload audio data to the remote computing resources 114 for processing, given that the remote computing resources 114 may have a computational capacity that far exceeds the computational capacity of the voice-controlled assistant 106. Therefore, the voice-controlled assistant 106 may utilize the speech-recognition engine 112 at the remote computing resources 114 for performing relatively complex analysis on audio captured from the environment 102.

Regardless of whether the speech recognition occurs locally or remotely from the environment 102, the voice-controlled assistant 106 may receive vocal input from the user 104 and the assistant 106 and/or the resources 114 may perform speech recognition to interpret a user's operational request or command. The requests may be for essentially type of operation, such as database inquires, requesting and consuming entertainment (e.g., gaming, finding and playing music, movies or other content, etc.), personal management (e.g., calendaring, note taking, etc.), online shopping, financial transactions, and so forth.

The voice-controlled assistant 106 may communicatively couple to the network 116 via wired technologies (e.g., wires, USB, fiber optic cable, etc.), wireless technologies (e.g., RF, cellular, satellite, Bluetooth, etc.), or other connection technologies. The network 116 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

As illustrated, the memory 110 of the voice-controlled assistant 106 also stores or otherwise has access to a user identification engine 124, a feedback engine 126, and one or more user profiles 128. The user identification engine 124 functions to identify a user that utters an audible command with reference to an audio signature associated with the utterance and, potentially, with reference to one or more other characteristics associated with the utterance.

For instance, upon the voice-controlled assistant 106 capturing audio with its microphone(s), the voice-controlled assistant 106 may compare the audio to the user profile(s) 128, each of which is associated with a respective user. Each user profile may store an indication of an audio signature 130 associated with the respective user based on previous voice interactions between the respective user and the voice-controlled assistant 106, other voice-controlled assistants, other voice-enabled devices or applications, or the respective user and services accessible to the device (e.g., third-party websites, etc.).

In addition, each of the profiles 128 may indicate one or more other characteristics 132 learned from previous interactions between the respective user and the voice-controlled assistant 106, other voice-controlled assistants, or other voice-enabled devices or applications. For instance, these characteristics may include:

commands often or previously issued by the respective user;
grammar typically used by the respective user;
a vocabulary typically used by the respective user;
content to which the respective user has access and/or content that the respective user often requests;
a schedule associated with the respective user, either learned over time or determined with reference to a calendaring application associated with the respective user;
third-party services that the respective user has registered with (e.g., music services, shopping services, email account services, etc.);
days on which the respective user often issues voice commands or is otherwise present in the environment;
times of day at which the respective user often issues voice commands or is otherwise present in the environment;
a location of the respective user when the voice-controlled assistant 106 captures the audio (e.g., obtained via a GPS location of a client device associated with the user);
previous interactions between the respective user and the voice-controlled assistant 106, other voice-controlled assistants, or other voice-enabled devices or applications;
background noise that commonly exists when the respective user interacts with the voice-controlled assistant 106 (e.g., certain audio files, videos, television shows, cooking sounds, etc.).

Of course, while a few examples have been listed, it is to be appreciated that the techniques may utilize multiple other similar or different characteristics when attempting to identify the user 104 that utters a command. For instance, the voice-controlled assistant 106 may reference which users have recently interacted with the assistant 106 in determining which user is likely currently interacting with the device. The amount of influence this factor has in determining which user is interacting with the assistant 106 may decay over time. For instance, if one minute ago a particular user made a request to the assistant, then the assistant may weight this interaction more greatly than if the interaction was ten minutes prior. Furthermore, in some instances, multiple user profiles may correspond to a single user. Over time, the voice-controlled assistant 106 may map each of the multiple profiles to the single user, as the assistant 106 continues to interact with the particular user.

Upon receiving audio within the environment 102, the speech-recognition engine 112 may first attempt to identify whether or not the audio contains speech, such as speech from the user 104. If so, then the speech-recognition engine 112 may perform automatic speech recognition (ASR) on the audio and may perform an action corresponding to any command from the audio. For instance, in the illustrated example, the user 104 issues a command 134(1) requesting that the voice-controlled assistant 106 begin playing a particular song by the Beatles. As such, the speech-recognition engine 112 may identify this command and the voice-controlled assistant 106 may begin playing the song (or may instruct another device to begin playing the song).

In addition, in response to receiving the audio from the user 104, the user identification engine 124 may attempt to identify the user 104 that issued the command. As discussed above, the engine 124 may identify the user with reference to both an audio signature of an audio signal generated from the received audio and one or more characteristics associated with the command from the received audio.

In the illustrated example, for instance, when the user 104 utters the command 134(1), the user identification engine 124 may compare the audio to one or more user profiles. This may include comparing a signature of an audio signal associated with an audio signal generated from the received audio to a signature associated with each of the profiles. Each signature may uniquely identify a user's voice based on a combination of one or more of a volume, pitch, tone, frequency, and the like.

In addition, comparing the audio to the user profile may include comparing certain characteristics associated with the audio command to certain characteristics stored in the user profile. These characteristics stored in the user profile may be determined for each user with reference to past behavior by these users, and/or by these users configuring the characteristics themselves. For instance, a user profile may indicate that a particular user often listens to the Beatles, usually issues commands to the voice-controlled assistant 106 at night, and often issues commands from a southwest corner of the room 102.

Based on comparing the audio signal to the profile (including comparing the audio signature to the profiles' signatures and characteristics of the command to the profiles' characteristics), the user identification engine 124 may make a presumed identification of the user. In this example, for instance, the user 104 issues a command 134(1) to play a particular song by the Beatles. In response, the voice-controlled assistant 106 may determine that the audio signature of this command 134(1) correlates closely to an audio signature associated with a user profile of the user 104. In addition, the voice-controlled assistant 106 may determine that the user 104 has access to that particular song, often listens to the Beatles, and often issues commands at the time at which the user 104 issued the command. As such, the user identification engine 124 may make a presumed identification of the user.

In addition, and as illustrated, the voice-controlled assistant 106 may output a response 134(2) after performing the speech recognition and identifying the user 104. For instance, the voice-controlled assistant 106 may output an indication that the assistant will comply with the request, with this indication being audible, visual, or the like. Here, for instance, the voice-controlled assistant 106 audibly outputs the response 134(2), indicating that the voice-controlled assistant 106 will begin playing the song along with an indication that the assistant has identified the user 104 as "John".

In response to receiving this presumed identification, the user 104 may in some instances correct the voice-controlled assistant 106. For instance, the user 104 may state "I am not John, I'm Steve". In response to the speech-recognition engine 112 decoding this speech, the feedback engine 126 may update the profile associated with Steve and/or the profile associated with John. If the user 104 does not comment or if the user 104 explicitly confirms this identification, then the feedback engine 126 may update John's profile (e.g., the signature, the characteristics, etc.).

In still other instances, the voice-controlled assistant 106 may request that the user 104 explicitly confirm or deny the presumed identification. For instance, the voice-controlled assistant 106 may ask "Are you John?". As such, the user 104 is given the opportunity to confirm or deny this authentication, either of which allows the feedback engine 126 to identify the user 104 more accurately in the future.

After accurately identifying the user 104, either via an accurate identification from the user identification engine 124 or via the user 104 correcting the engine 124, the voice-controlled assistant 106 is able to implement one or more preferences associated with the user 104. For instance, the voice-controlled assistant 106 may utilize a preferred volume of the requested song, may utilize a preferred stereo system on which to play back the requested song (e.g., via a home stereo system, speakers integral with the voice-controlled assistant 106, etc.), and/or may implement any other preferences of the user 104. In addition or in the alternative, the voice-controlled assistant 106 may utilize the identification of the user 104 in multiple other ways.

Illustrative Voice-Controlled Assistant

Figure 2:
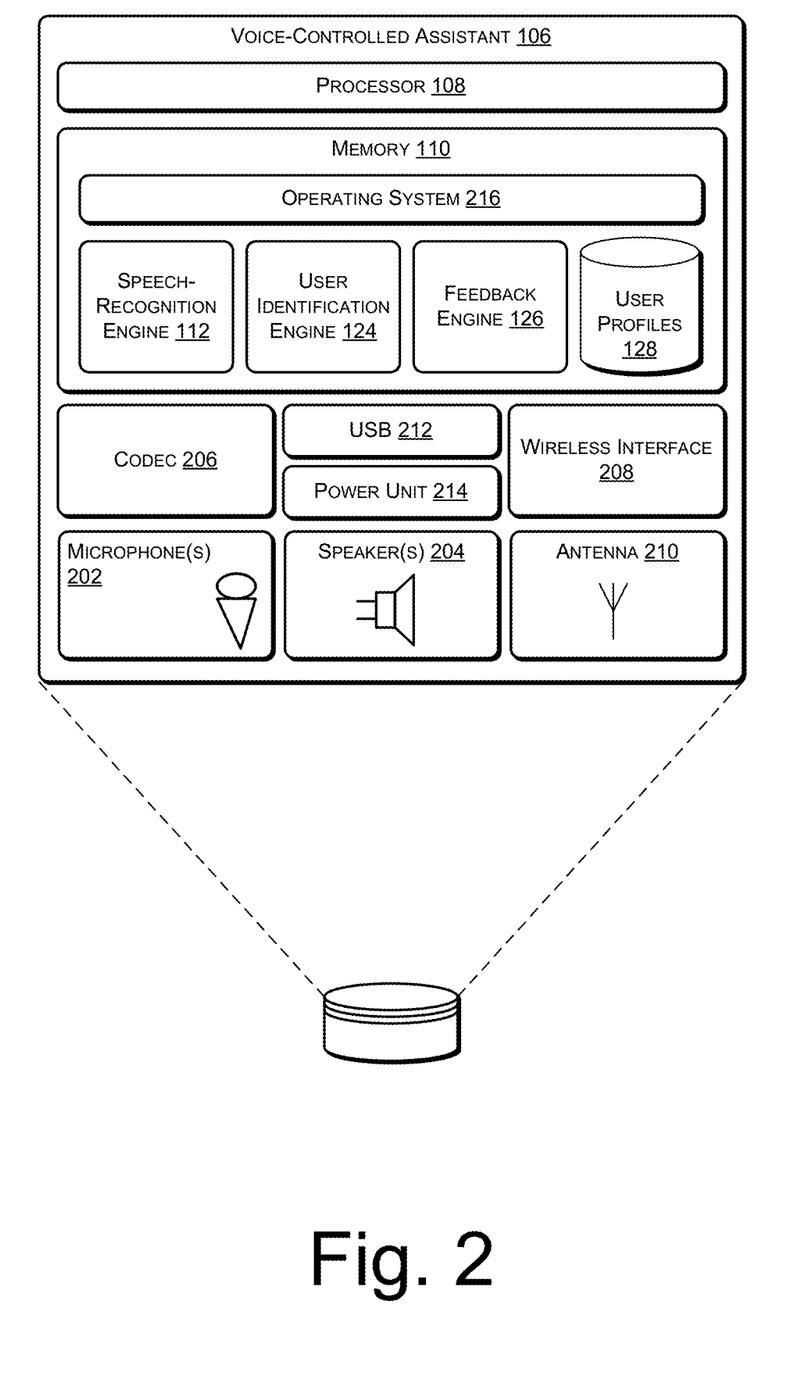
FIG. 2 shows a block diagram of selected functional components implemented in the voice-controlled assistant of FIG. 1.

FIG. 2 shows selected functional components of the voice-controlled assistant 106 in more detail. Generally, the voice-controlled assistant 106 may be implemented as a standalone device that is relatively simple in terms of functional capabilities with limited input/output components, memory and processing capabilities. For instance, the voice-controlled assistant 106 does not have a keyboard, keypad, or other form of mechanical input in some implementations, nor does it have a display or touch screen to facilitate visual presentation and user touch input. Instead, the assistant 106 may be implemented with the ability to receive and output audio, a network interface (wireless or wire-based), power, and limited processing/memory capabilities.

In the illustrated implementation, the voice-controlled assistant 106 includes the processor 108 and memory 110. The memory 110 may include computer-readable storage media ("CRSM"), which may be any available physical media accessible by the processor 108 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 108.

The voice-controlled assistant 106 includes one or more microphones 202 to receive audio input, such as user voice input, and one or more speakers 204 to output audio sounds. A codec 206 is coupled to the microphone 202 and speaker 204 to encode and/or decode the audio signals. The codec may convert audio data between analog and digital formats. A user may interact with the assistant 106 by speaking to it, and the microphone 202 captures the user speech. The codec 206 encodes the user speech and transfers that audio data to other components. The assistant 106 can communicate back to the user by emitting audible statements through the speaker 204. In this manner, the user interacts with the voice-controlled assistant simply through speech, without use of a keyboard or display common to other types of devices.

In the illustrated example, the voice-controlled assistant 106 includes a wireless interface 208 coupled to an antenna 210 to facilitate a wireless connection to a network. The wireless interface 208 may implement one or more of various wireless technologies, such as wifi, Bluetooth, RF, and so on.

A USB port 212 may further be provided as part of the assistant 106 to facilitate a wired connection to a network, or a plug-in network device that communicates with other wireless networks. In addition to the USB port 212, or as an alternative thereto, other forms of wired connections may be employed, such as a broadband connection. A power unit 214 is further provided to distribute power to the various components on the assistant 106.

The voice-controlled assistant 106 is designed to support audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens, and the like. Further there is no display for text or graphical output. In one implementation, the voice-controlled assistant 106 may include non-input control mechanisms, such as basic volume control button(s) for increasing/decreasing volume, as well as power and reset buttons. There may also be a simple light element (e.g., LED) to indicate a state such as, for example, when power is on. But, otherwise, the assistant 106 does not use or need to use any input devices or displays in some instances.

Several modules such as instruction, datastores, and so forth may be stored within the memory 110 and configured to execute on the processor 108. An operating system module 216 is configured to manage hardware and services (e.g., wireless unit, USB, Codec) within and coupled to the assistant 106 for the benefit of other modules.

In addition, the memory 110 may include the speech-recognition engine 112, the user identification engine 124, the feedback engine 126, and the user profiles 128, discussed above. Also as discussed above, some or all of these engines, data stores, and components may reside additionally or alternatively at the remote computing resources 114.

Illustrative Processes

Figure 3:
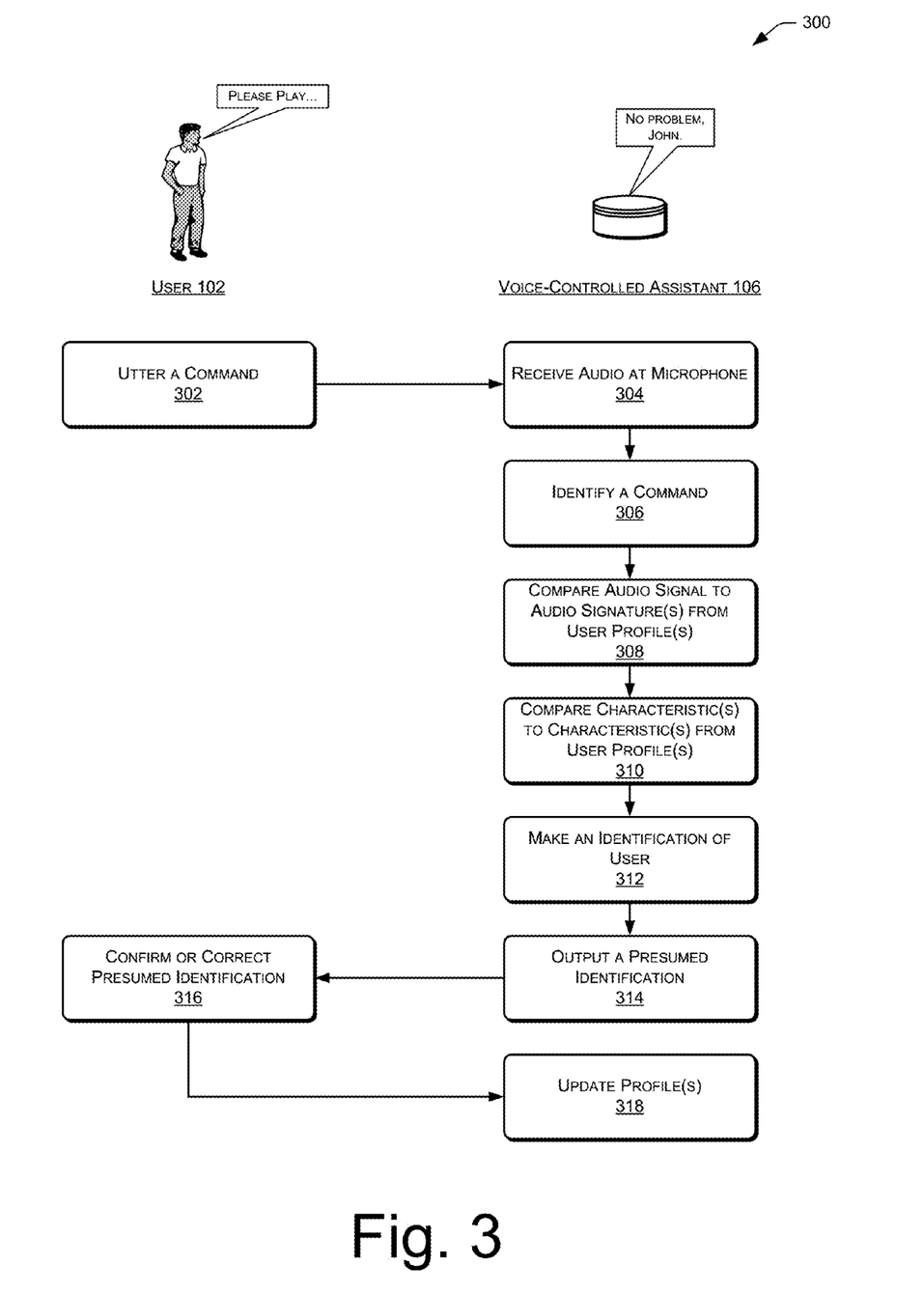
FIG. 3 depicts a flow diagram of an example process for identifying a user based on a signature of an audio signal that is generated based on audio received from the user and at least one additional characteristic associated with the received audio.

FIG. 3 depicts a flow diagram of an example process 300 for identifying a user based on a signature of an audio signal generated from audio received from the user and at least one additional characteristic associated with the received audio. Actions illustrated underneath the user 104 may be performed by the user, while actions illustrated under the voice-controlled assistant 106 may be performed by the voice-controlled assistant 106 or, in some instances, the remote computing resources 114.

The process 300 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 302, the user 104 utters an audible command, which a microphone of the voice-controlled assistant 106 receives at 304. At 306, the voice-controlled assistant 106 performs speech recognition on an audio signal associated with the received audio to identify a command therein. At 308, the voice-controlled assistant 106 compares the audio signal to one or more previously received audio signatures from corresponding user profiles, which may each be associated with a respective user. This comparing may include comparing a volume, pitch, tone and/or frequency of the audio signal with a respective volume, pitch, tone and/or frequency of each of the audio signatures from the user profiles.

At 310, the voice-controlled assistant 106 may compare one or more characteristics of the command to one or more corresponding characteristics from the user profiles. At 312, the voice-controlled assistant 106 makes an identification of the user based at least in part on both of the comparing actions at 308 and 310. At 314, the voice-controlled assistant 106 outputs a presumed identification, either via a speaker or other output component (e.g., a display) of the voice-controlled assistant 106, or a speaker or other output component of another device within the environment.

At 316, the user may confirm or correct the presumed identification. For instance, if the voice-controlled assistant 106 identifies the user as John, the user may state "I am actually Steve" to correct the identification. Or, the user may explicitly confirm the presumed identification by stating "Yes, I am John" or may implicitly confirm the presumed identification by refraining from correcting the voice-controlled assistant 106. At 318, the voice-controlled assistant 106 may update one or more profiles based on the feedback received from the user at 316.

Figure 4:
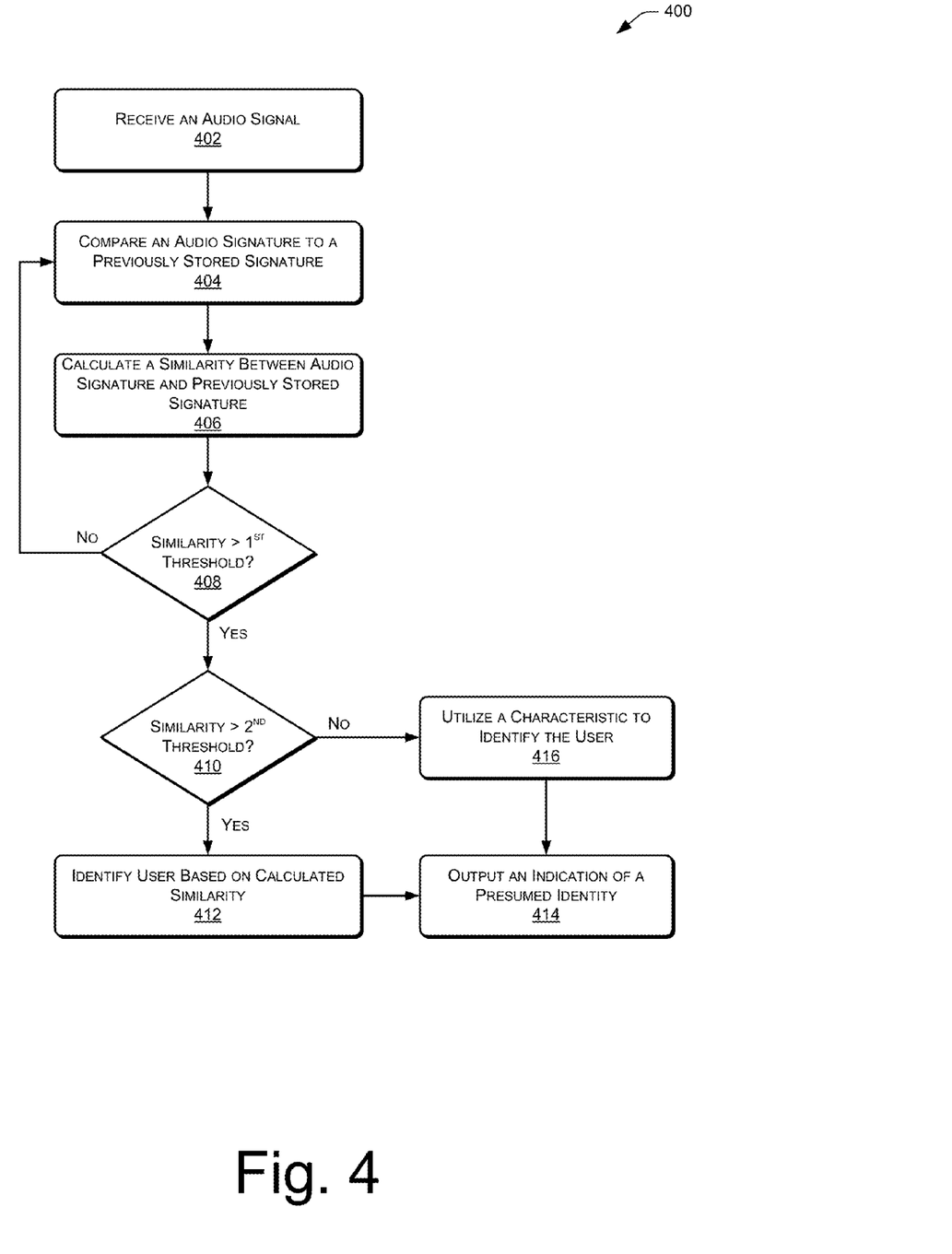
FIG. 4 depicts a flow diagram of an example process for receiving audio from a user, calculating a similarity between a signature associated with a generated audio signal and a previously received signature associated with a user. If the calculated similarity is greater than a threshold, then the process identifies the user using the audio signature. If not, then the process may identify the user using the audio signature and a characteristic other than the audio signature.

In some instances, when the user corrects the presumed identification, the voice-controlled assistant 106 may first perform some sort of verification of this identity prior to updating the profiles. For instance, the assistant 106 may return to 308 and/or 310 to compare the audio signature of the alleged user to the signature of the generated audio signal, or to compare characteristics of the alleged user to the characteristics of the received voice command. If the signature or the characteristics do not match their counterparts by more than a threshold, then the assistant 106 may determine that the user has attempted to falsify his or her identify and may refrain from updating the profiles (and potentially from performing an operation for the user). In addition or in the alternative, when the user corrects the identification, the assistant may request that the user provide some sort of authentication, such as by providing a password or PIN associated with the user, or the like FIG. 4 depicts a flow diagram of another example process 400. At 402, the process 400 receives an audio signal, such as an audio signal associated with audio captured by a voice-controlled assistant. At 404, the process 400 compares a signature of the audio signal to a previously stored signature that is associated with a particular user. As discussed above, this may include comparing a volume, pitch, frequency, tone, and/or other audio characteristics of the received signal to the stored signal.

At 406, the process 400 calculates a similarity between the signature of an audio signal generated from the received audio signal and the previously stored signal. At 408, the process 400 determines whether this calculated similarity is greater than a first threshold. If not, meaning that the signature of the generated signal does not match well with the selected signature to which it was compared, then the process 400 may loop back to 404 to compare the signature of the generated signal to another previously generated signature associated with a different user.

If, however, the calculated similarity is greater than the first threshold, then at 410 the process 400 may determine whether the calculated similarity is greater than a second threshold. If so, meaning that the signature of the generated signal and the selected signature are strong matches, then at 412 the process 400 may identify the user associated with the received audio. Specifically, the process 400 may identify the user that uttered the audio as the user associated with the previously recited signature. At 414, the process 400 may then output this presumed identification, such as audibly, visually, and/or in any other manner.

If, however, the process 400 determines that the calculated similarity is not greater than the second threshold, then at 416 the process may utilize an additional characteristic to aid in identifying the user associated with the received signal. For instance, the process 400 may utilize one or more of the characteristics discussed above, such as a grammar or vocabulary associated with the audio, a piece of content referenced in the audio, or the like. After identifying the user using both the calculated similarity and the additional characteristic(s), at 414 the process may output this presumed identification.

Figure 5:
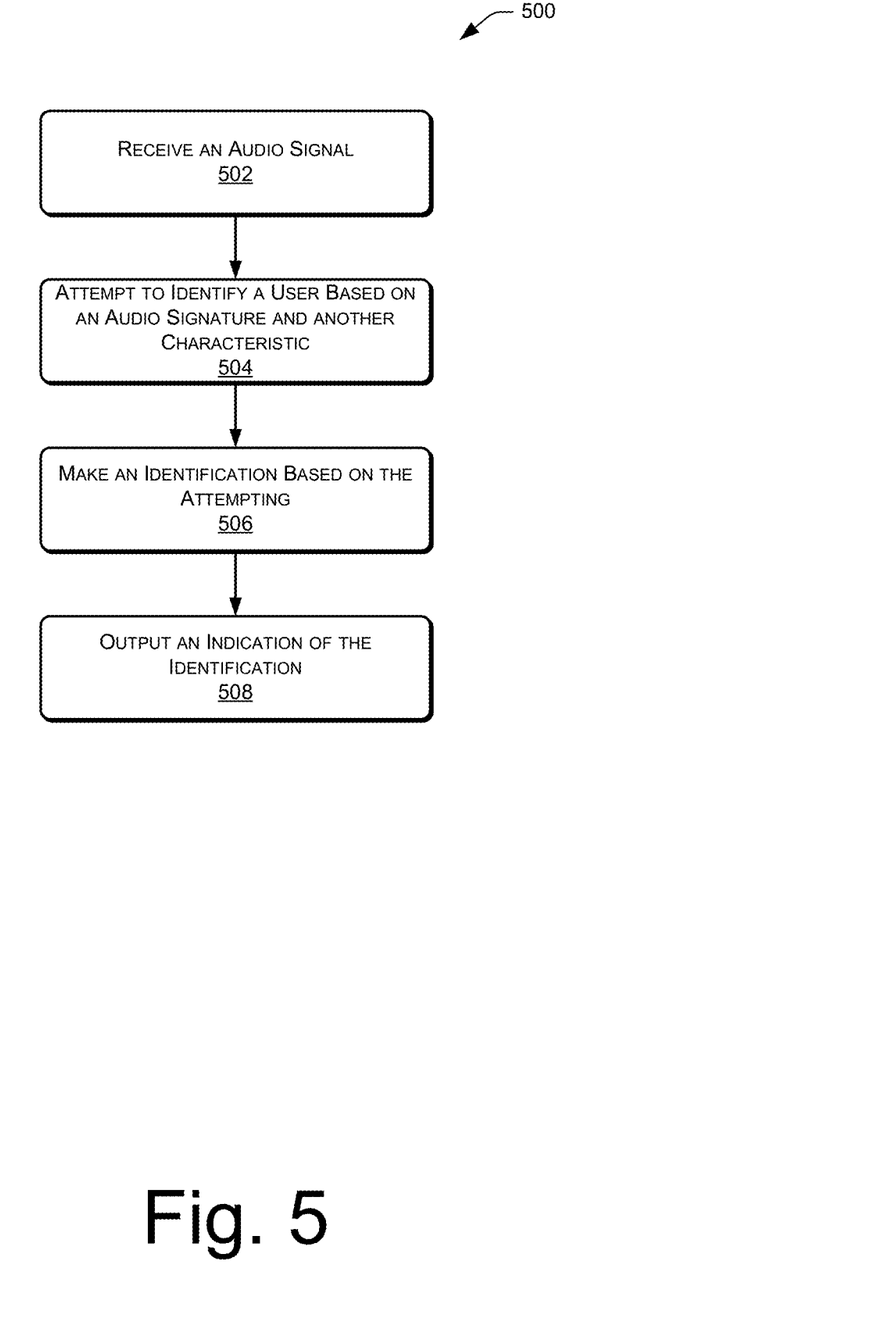
FIG. 5 depicts a flow diagram of an example process for receiving an audio signal and identifying a user based on a signature of the audio signal and another characteristic. The process also makes a presumed identification of the user and outputs this presumed identification.

FIG. 5 depicts a flow diagram of yet another example process 500. At 502, the process again receives an audio signal associated with audio captured in an environment. At 504, the process 500 attempts to identify the user based on an audio signature of the signal as well as with reference to a characteristic of the audio signal other than the signature. At 506, the process makes an identification of the user based on the attempting. Finally, at 508, the process 500 outputs an indication of the identification made at 506.

Figure 6:
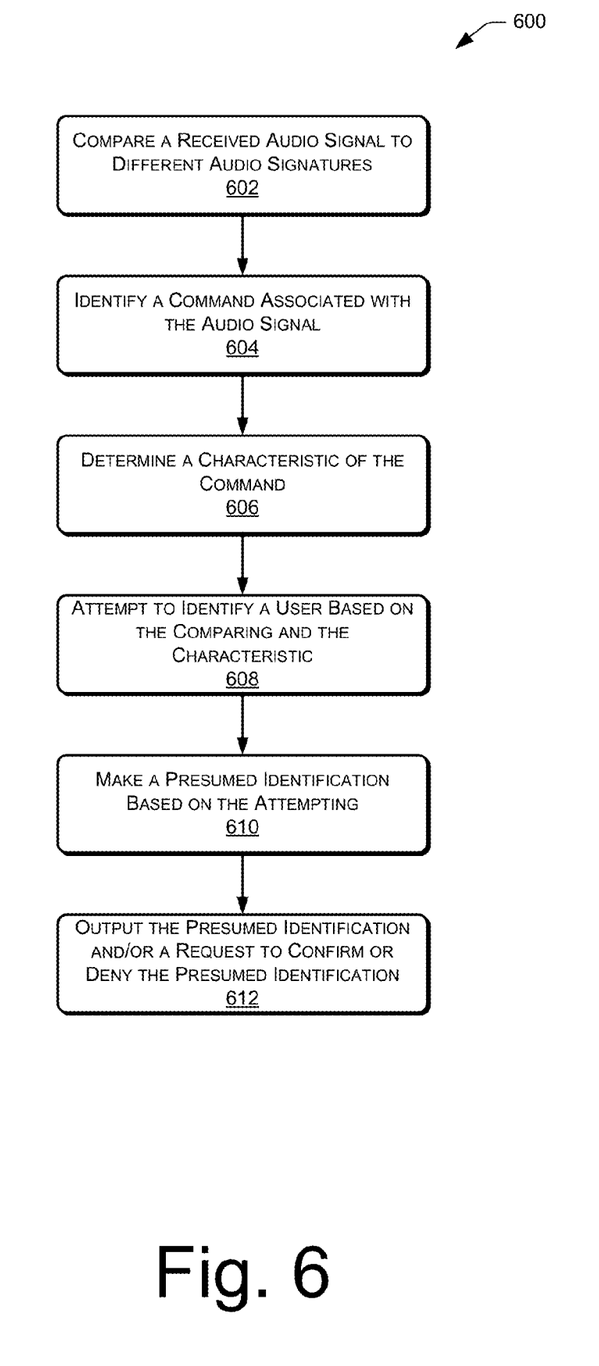
FIG. 6 depicts a flow diagram of an example process for identifying a user using an audio signature associated with a voice command and another characteristic associated with the voice command.

FIG. 6 depicts a flow diagram of another example process 600. At 602, the process 600 may compare a received audio signal to different audio signatures. At 604, the process 600 identifies a command associated with the signal by, for instance, performing speech recognition on the received signal. At 606, the process 600 determines a characteristic of the command, such as content referenced by the command, a grammar or vocabulary of the command, a time of day at which the user uttered the command, or the like.

At 608, the process 600 attempts to identify the user based on the comparing at 602 and on the characteristic(s) determined at 606. At 610, the process 600 makes a presumed identification and, at 612, outputs the presumed identification, potentially along with a request that the user confirm or deny the presumed identification.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An apparatus comprising:
  a microphone;
  a processor; and
  computer-readable media storing computer-executable instructions that, when executed on the processor, cause the processor to perform acts comprising:
    generating, by the microphone, an audio signal based on audio uttered by a user and captured by the microphone;
    comparing a signature of the audio signal to a previously stored signature that is associated with a particular user;
    calculating a similarity between the signature of the audio signal and the previously stored signature based at least in part on the comparing;
    at least partly in response to the similarity being greater than a threshold, identifying the user that uttered the audio as the particular user; and
    at least partly in response to the similarity being less than the threshold:
      identifying a command associated with the audio signal;
      determining a characteristic associated with the command; and
      attempting to identify the user that uttered the audio based at least in part on the signature of the audio signal and on the determined characteristic.

2. An apparatus as recited in claim 1, wherein the comparing comprises comparing the signature of the audio signal to multiple previously stored signatures, each of the multiple previously stored signatures being associated with a different respective user.

3. An apparatus as recited in claim 1, wherein the attempting to identify the user that uttered the audio is further based at least in part on at least one of a sequence of words within the audio uttered by the user, content to which the user has access, a schedule associated with the user, information about services with which the user has registered with, or a time of day at which the user uttered the audio.

4. An apparatus as recited in claim 1, wherein the attempting to identify the user that uttered the audio is further based at least in part on information about a room in which the apparatus resides.

5. An apparatus as recited in claim 1, wherein the attempting to identify the user that uttered the audio is further based at least in part on information about a location within a room at which the user uttered the audio.

6. An apparatus as recited in claim 1, wherein the attempting to identify the user that uttered the audio is further based at least in part on at least one of previous interactions between the user and the apparatus, between the user and an application associated with the apparatus, or between the user and a service accessible to the apparatus.

7. An apparatus as recited in claim 1, the acts further comprising receiving an indication of a location of a device associated with the user, and wherein the attempting to identify the user that uttered the audio is further based at least in part on the indication of the location of the device associated with the user.

8. An apparatus as recited in claim 1, wherein the microphone further captures additional audio from an environment, and the attempting to identify the user that uttered the audio is further based at least in part on the additional audio from the environment.

9. An apparatus as recited in claim 1, further comprising a speaker, and the acts further comprising outputting an indication of a presumed identity of the user via the speaker.

10. A method comprising:
  under control of one or more computing systems configured with executable instructions,
  receiving an audio signal generated by a microphone based on audio uttered by a user;
  comparing a signature of the audio signal to a previously stored audio signature that is associated with a particular user;
  calculating a similarity between the signature of the audio signal and the previously stored audio signature;
  at least partly in response to the similarity being greater than a threshold, identifying the user that uttered the audio as the particular user; and
  at least partly in response to the similarity being less than the threshold:
    identifying a command associated with the audio signal;
    determining a characteristic associated with the command; and
    attempting to identify the user that uttered the audio based at least in part on the signature of the audio signal and on the determined characteristic.

11. A method as recited in claim 10, wherein the signature of the audio signal is based at least in part on at least one of a volume, a pitch, a tone or a frequency of the audio signal.

12. A method as recited in claim 10, wherein the receiving and the attempting occur at a device that includes the microphone that captures the audio uttered by the user and generates the audio signal.

13. A method as recited in claim 10, wherein the receiving and the attempting occur at a computing device that is remote from a device that captured the audio uttered by the user and that generated the audio signal.

14. A method as recited in claim 10, wherein the attempting comprises comparing the signature of the audio signal to multiple audio signatures associated with respectively different users, the comparing comprising comparing a volume, a pitch, a tone or a frequency of the audio signal to respective volumes, pitches, tones or frequencies of the multiple audio signatures associated with the respectively different users.

15. A method as recited in claim 10, wherein the attempting to identify the user that uttered the audio is further based at least in part on a grammar of the audio uttered by the user.

16. A method as recited in claim 10, wherein the attempting to identify the user that uttered the audio further comprises:
   identifying content referenced in the audio uttered by the user; and
   determining which one or more users of multiple users have access to the referenced content.

17. A method as recited in claim 10, wherein the attempting to identify the user that uttered the audio is further based at least in part on at least one of a time of day or a day on which the audio is uttered by the user.

18. A method as recited in claim 10, wherein the attempting to identify the user that uttered the audio is further based at least in part on information about a location within a room at which the audio is uttered by the user.

19. A method as recited in claim 10, wherein the audio is received by a device, and the attempting to identify the user that uttered the audio is further based at least in part on previous commands received by the device.

20. A method as recited in claim 10, wherein the audio is received by a device, and the attempting to identify the user that uttered the audio is further based at least in part on previous interactions between the device and one or more different users, between an application associated with the device and one or more different users, or between a service accessible to the device and one or more different users.

21. A method as recited in claim 10, further comprising receiving an indication of a geographical location of a device associated with the user, and wherein the attempting to identify the user that uttered the audio is further based at least in part on the indication of the geographical location of the device associated with the user.

22. A method as recited in claim 10, further comprising:
   making an identification of the user based at least in part on the attempting; and
   outputting an indication of the identification.

23. Non-transitory computer-readable media storing computer-executable instructions that, when executed on a processor, cause the processor to perform acts comprising:
   receiving a generated audio signal that has been generated by a microphone based on audio captured by the microphone;
   comparing a signature of the generated audio signal to a previously stored audio signature associated with a particular user;
   calculating a similarity between the signature of the generated audio signal and the previously stored audio signature;
   at least partly in response to the similarity being greater than a threshold, identifying a user that uttered audio associated with the generated audio signal as the particular user; and
   at least partly in response to the similarity being less than the threshold:
      identifying a command associated with the generated audio signal;
      determining a characteristic associated with the command; and
      attempting to identify the user that uttered the audio associated with the audio signal based at least in part on the signature of the generated audio signal and on the determined characteristic.

24. Computer-readable media as recited in claim 23, wherein the command requests a particular piece of content, and the characteristic comprises the particular piece of content.

25. Computer-readable media as recited in claim 23, wherein the command comprises a request to output an audio file, and the characteristic comprises the audio file associated with the request.

26. Computer-readable media as recited in claim 23, wherein the characteristic comprises a grammar associated with the command.

27. Computer-readable media as recited in claim 23, the acts further comprising:
   making a presumed identification of the user that uttered the audio based at least in part on the attempting; and
   outputting the presumed identification via a speaker.

28. Computer-readable media as recited in claim 23, the acts further comprising:
   making a presumed identification of the user that uttered the audio based at least in part on the attempting; and
   outputting a request to the user to confirm or deny the presumed identification via a speaker.

* * * * *